United States Patent
Zamani

(10) Patent No.: US 12,458,812 B2
(45) Date of Patent: Nov. 4, 2025

(54) FACE MASK

(71) Applicant: MZ Skin Limited, London (GB)

(72) Inventor: Maryam Zamani, London (GB)

(73) Assignee: MZ Skin Limited, London (GB)

( * ) Notice: Subject to any disclaimer, the term of this patent is extended or adjusted under 35 U.S.C. 154(b) by 400 days.

(21) Appl. No.: 17/929,125

(22) Filed: Sep. 1, 2022

(65) Prior Publication Data

US 2023/0147810 A1 May 11, 2023

(30) Foreign Application Priority Data

Nov. 5, 2021 (GB) ...................... 2115931

(51) Int. Cl.
  *A61N 5/06* (2006.01)
  *B29C 35/02* (2006.01)
  *B29C 35/08* (2006.01)

(52) U.S. Cl.
  CPC .... *A61N 5/0616* (2013.01); *A61N 2005/0647* (2013.01); *A61N 2005/0659* (2013.01); *A61N 2005/0661* (2013.01); *B29C 35/02* (2013.01)

(58) Field of Classification Search
  CPC ......... B29C 35/02; A61B 18/20–18/28; A61N 5/06–2005/073
  USPC ..................... 607/88–92; 606/2–19
  See application file for complete search history.

(56) References Cited

U.S. PATENT DOCUMENTS

| | | | | |
|---|---|---|---|---|
| 4,780,260 A | * | 10/1988 | Yoshida | C08J 3/245 427/407.1 |
| 5,913,883 A | * | 6/1999 | Alexander | A61N 5/0616 D24/231 |
| 2014/0148879 A1 | * | 5/2014 | Mersch | A61N 1/0492 607/90 |
| 2015/0091218 A1 | * | 4/2015 | Serebrennikov | B29C 35/02 425/501 |
| 2021/0360999 A1 | * | 11/2021 | Yelken | A41D 13/1146 |
| 2022/0226668 A1 | * | 7/2022 | Lee | A61N 5/0624 |

FOREIGN PATENT DOCUMENTS

| | | | | |
|---|---|---|---|---|
| CN | 215351604 U | * | 12/2021 | |
| KR | 20230000063 | * | 1/2023 | A61N 5/063 |

* cited by examiner

*Primary Examiner* — Benjamin J Klein
*Assistant Examiner* — Vynn V Huh
(74) *Attorney, Agent, or Firm* — Dergosits & Noah LLP; Michael E. Dergosits

(57) ABSTRACT

A phototherapy mask comprising: a backing layer; a translucent layer disposed on the rear surface of the backing layer; and a plurality of light emitters sandwiched between the backing layer and the translucent layer; wherein the backing layer and the translucent layer together form a flexible structure that self-supportingly adopts a form that is concave to the rear of the mask.

6 Claims, 2 Drawing Sheets

FACE MASK

TECHNICAL FIELD

This invention relates to a face mask and a method of manufacturing a face mask.

BACKGROUND

Face masks are known in which a posterior surface of the mask is provided with light emitters. When the mask is positioned against the face of a wearer, the light emitters can be activated. It is believed that this can provide a phototherapeutic effect, for example by improving skin condition, boosting collagen production and inhibiting disorders of the skin.

It is desirable for a face mask of this type to be comfortable to wear, and also to conform well to the face of the wearer. If the mask does not conform to the face of the wearer, the intensity of radiation from the mask may vary over the wearer's skin, resulting in regions being over- or under-irradiated.

Known face masks of this type can be either rigid or highly flexible. A rigid mask can be uncomfortable to wear, and is unlikely to fit a particular wearer well unless it has been custom-made for that individual. A highly flexible mask can conform well to the shape of a wearer's face, but it can be difficult to hold in place and can easily move whilst being worn.

Accordingly, there is a need for an improved form of face mask.

BRIEF DESCRIPTION OF THE DRAWINGS

The present invention will now be described by way of example with reference to the accompanying drawings. In the drawings.

DETAILED DESCRIPTION OF THE DRAWINGS

Figure 1:
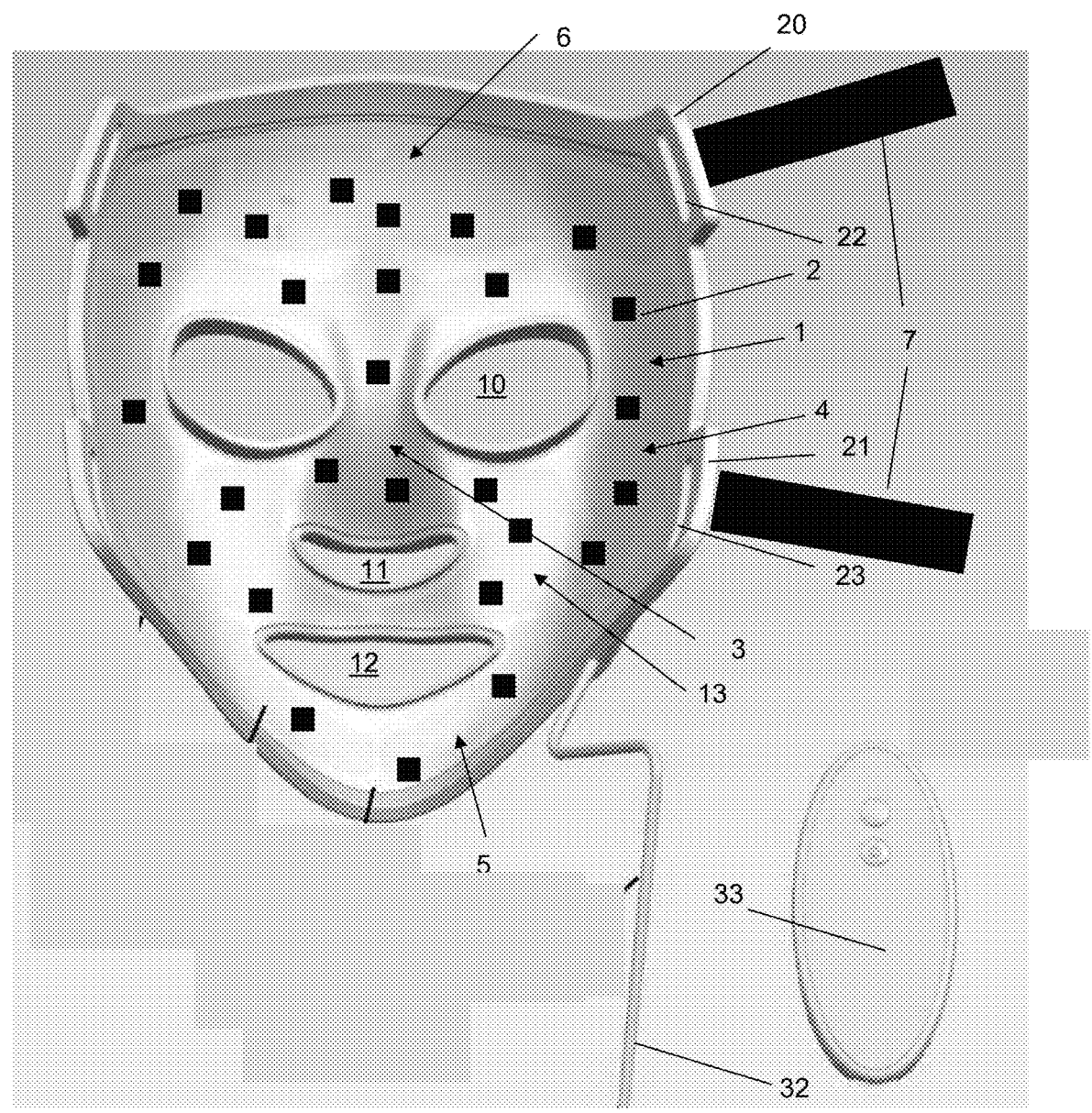
FIG. 1 shows the posterior of a face mask.

The following description is presented to enable any person skilled in the art to make and use the invention, and is provided in the context of a particular application. Various modifications to the disclosed embodiments will be readily apparent to those skilled in the art.

The general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

According to one aspect there is provided a phototherapy mask comprising: a backing layer; a translucent layer disposed on the rear surface of the backing layer; and a plurality of light emitters sandwiched between the backing layer; wherein the backing layer and the translucent layer together form a flexible structure that self-supportingly adopts a form that is concave to the rear of the mask.

The translucent layer may be softer than the backing layer.

According to a second aspect there is provided a phototherapy mask comprising: a backing layer; a translucent layer disposed on the rear surface of the backing layer; and a plurality of light emitters sandwiched between the backing layer; wherein the backing layer and the translucent layer together form a flexible structure and the translucent layer is softer than the backing layer.

The Shore A hardness of the translucent layer may be less than that of the backing layer.

The translucent layer may be of the same hardness as the backing layer.

The Shore A hardness of the translucent layer may be the same as that of the backing layer.

The translucent layer and the backing layer may be formed of the same polymer. The translucent layer may have a greater degree of cross-linking than the backing layer.

The light emitters may be dispersed substantially uniformly over the area of the mask.

The light emitters may be capable of emitting one or both of infrared and ultraviolet light.

The backing layer and the translucent layer may together form a flexible structure that self-supportingly adopts a human facial form.

The mask may comprise a central plateau and cheek regions extending rearwardly and laterally from the central plateau.

The mask may comprise attachment structures at the rear of the cheek regions and one or more flexible straps attached to the attachment structures.

The mask may comprise a first pair of attachment structures, each attachment structure of that pair being located on a respective side of the mask, and a second pair of attachment structures, each attachment structure of that pair being located on a respective side of the mask and below an attachment structure of the first pair.

The Shore A hardness of the translucent material may be in the range from 20 to 40.

The Shore A hardness of the translucent material may be in the range from 30 to 50.

According to a third aspect there is provided a method for forming a phototherapy mask, comprising: forming a backing layer of a polymer material; treating the backing layer so as to cause cross linking of the polymer material of the backing layer; disposing a plurality of light emitters over the backing layer; forming a translucent layer of a polymer material over the light emitters and at least part of the backing layer; and treating the translucent layer and the backing layer so as to cause cross linking of the polymer material of the translucent layer and further cross linking of the polymer material of the backing layer.

The said treating may comprise heating the layer(s) to a temperature greater than 130° C.

The cross-linking may result from vulcanisation.

The present invention will be described by way of example with reference to the drawings.

Figure 2:
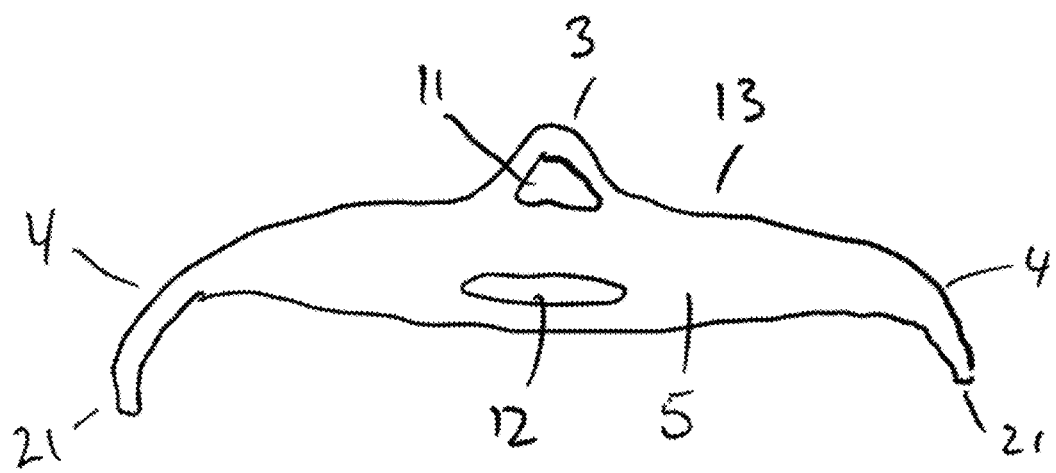
FIG. 2 shows the face mask of FIG. 1 from below, with the posterior side to the bottom of the figure.

FIG. 1 shows the posterior of a face mask. FIG. 2 shows the face mask of FIG. 1 from below, with the posterior side to the bottom of the figure. The face mask of FIG. 1 comprises a sheet 1 of flexible, resilient material. The posterior face of the sheet, which faces the wearer when the mask is being worn, is provided with light emitters 2. The light emitters can emit light for phototherapy. The mask is pre-shaped to the general form of a human face. The nose region 3 is concave when viewed from the posterior side of the mask. The cheek regions 4, the chin region 5 and the forehead region 6 curve in a posterior direction as they extend to the lateral edges of the mask. The sheet material of which the mask is formed is sufficiently stiff to hold its pre-shaped form against gravity when it is not being worn. This can make it relatively easy to apply to the face, and can enable it to resist falling away from the shape of the user's face when it is worn. However, the sheet material it is sufficiently flexible that when the mask is applied to the face of a user and attached in place by straps 7, as will be described further below, the mask can increase in conformity to the wearer's face, especially around the cheeks and the temples. This can provide improved comfort and uniformity of irradiation over other masks.

The mask may be semi-rigid. The mask may self-supportingly adopt a concave-downwards shape when laid with its rear on and facing a flat horizontal surface. The mask may self-supportingly adopt a concave-upwards shape when laid with its front on and facing a flat horizontal surface.

The mask adopting a concave shape may mean that the overall shape of the mask is concave. Parts of the mask may be convex within that overall concave shape. The periphery of the mask may form a rim that extends further, e.g. by at least 10 mm or 20 mm or 30 mm, in the direction from which the concavity is directed than any part of the mask internal of the rim.

In more detail, the sheet 1 of the face mask has a pre-formed three-dimensional shape which resembles the contours of a human face. The sheet has apertures whose locations correspond, when the mask is in place on a wearer's face, to the eyes (apertures 10), the base of the nose (aperture 11) and the mouth (aperture 12) of the wearer. The mask is generally concave when viewed from its posterior side. A frontal plateau of the mask, shown generally at 13, has a gentle concave curvature when viewed from the posterior side of the mask. Peripheral regions of the mask, constituted by cheek regions 4, chin region 5 and forehead region 6 border and adjoin the frontal plateau 13. The peripheral regions are directed more posteriorly, giving the mask generally a bowl shape when viewed from the rear. A nose region 3 is located in the middle of the central plateau. It is located between the eye apertures 10 and above the nose base aperture 11. The nose region is of sharper concavity than the frontal plateau. The lower part of the nose region is broader than the upper part, so as to fit generally to a typical human form.

By way of example only, the depth of parts of the mask may be as follows:
- depth of concavity of frontal plateau: in the range from 10 to 30 mm
- height of cheek regions: in the range from 40 to 80 mm
- height of chin and/or forehead regions: in the range from 20 to 40 mm
- depth of nose region from the frontal plateau: in the range from 20 to 40 mm At the lateral edges of the mask, the sheet 1 constitutes upper (20) and lower (21) tabs. The tabs extend laterally beyond the lateral edge of the cheek regions. Each tab defines a through-hole 22, 23. The through-holes can receive straps 7. One strap can pass through and anchor to through-holes 22. A second strap can pass through and anchor to through-holes 23. The straps can pass around the rear of a wearer's head and can be tightened, e.g. by buckles, elastic portions or adjustable hook-and-loop fastenings, to hold the mask in place on the wearer's head. The tabs 20 and 21, which provide fitments for the straps, are spaced apart vertically. Tabs 20 may be located above the majority or the entirety of the vertical extent of the nose region. Tabs 21 may be located below the majority or the entirety of the vertical extent of the nose region. This spacing of the tabs results in the tabs collectively being able to exert a spread rearward force on the sides of the mask, which can assist in conforming the mask to the face of a user over a large vertical extent.

When a user dons the mask the pre-formed shape of the mask and the fact that the mask is sufficiently stiff to be self-supporting means that the mask can immediately fit generally to the user's face. This induces the wearer to apply the mask in the correct position. It also results in an initial level of conformity of the mask to the user's face.

When the straps are tightened, the flexibility of the mask is such that the action of tightening the straps draws the cheek regions 4 of the mask towards each other generally along the transverse axis of the wearer. The action of tightening the straps also draws the frontal plateau of the mask towards the face of the wearer, generally along the sagittal axis of the wearer. The action of tightening the straps may also induce additional curvature on the frontal plateau. These actions all bring the mask into closer conformity with the wearer's face than the initial level of conformity. As the straps are tightened, parts of the mask can move closer to the wearer's face. Thus, an initial level of conformity can be achieved as a result of the mask being able to hold its pre-formed shape. Then an increased level of conformity can be achieved by tightening the straps, with the pre-shaping of the mask inducing at least the cheek regions and the frontal plateau to move, as a result of the pliability of the sheet 1, into greater conformity with the user's face.

The mask may be shaped to provide walls that extend rearwardly around the eye apertures 10 and out of the laminate formed by the backing and translucent sheets. These walls may make contact with a wearer's skin around their eyes to inhibit light generated by the mask from entering the wearer's eyes.

Figure 3:
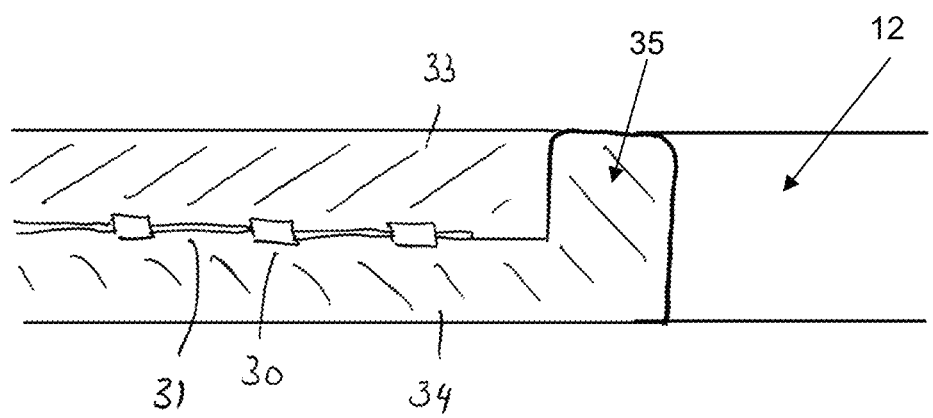
FIG. 3 shows a cross-section through a part of the face mask of FIG. 1.

FIG. 3 shows a cross-section through a part of the face mask of FIG. 1. A plurality of light emitters 30 are set into the mask. The light emitters are arranged to emit light in a posterior direction, so that when the mask is in place on a wearer the skin of the wearer's face can be illuminated or irradiated by the light emitters. This may provide a phototherapeutic effect. For providing a phototherapeutic effect, the light emitters may conveniently emit predominantly or exclusively ultraviolet light. They may emit predominantly or exclusively light in the UV(A) band. They may emit predominantly or exclusively light in the UV(B) band. They may emit predominantly or exclusively light in the near-infrared band. They may emit visible red light. Emissions of such a nature may provide dermatological benefits. Examples of such benefits may include a reduction in conditions of skin irritation or of immune overactivity and/or an improvement in skin tone. Infrared and/or ultraviolet radiation may help to treat acne vulgaris. Infrared radiation may help to treat facial wrinkles as a result of photobiomodulation. The light emitters may emit at a wavelength between 300 nm and 1200 nm, for example with intensity peaks at one or more of 620 to 640 nm or 820 to 840 nm or 405 to 425 nm. The mask may be capable of emitting with an irradiation intensity over 50% of the posterior area of the mask, measured parallel to the local posterior surface of the mask, of 1 to 60 mW/cm$^2$, or 10 to 50 mW/cm$^2$. In one example, the emitters may provide intensity peaks at 405 to 425 nm and 820 to 840 nm and the irradiation intensity measured as defined above may be not less than 13 mW/cm$^2$. In another example, the emitters may provide intensity peaks at 405 to 425 nm and 620 to 640 nm and the irradiation intensity measured as defined above may be not less than 24 mW/cm$^2$. Some of the light emitters may emit in a first frequency band and others of the light emitters may emit in a second frequency band different from the first frequency band. For example, some of the light emitters may have an emission peak in the region from 400 to 450 nm and optionally another emission peak in the range from 600 to 650 nm. Others of the light emitters may have an emission peak in the region from 600 to 850 nm, or from 800 to 850 nm, and also in the region from 400 to 450 nm.

The light emitters may, for example, be light-emitting diodes. They may alternatively be fluorescent devices.

Conductive electrical connections 31 extend within the sheet of the mask for supplying power to the light emitters. The electrical connections are connected to a supply cable 32 which is external to the sheet 1. The supply cable can be plugged into a power supply for powering the light emitters. Conveniently the supply cable may terminate in a USB connector. Alternatively, the light emitters may be supplied with power by a battery in the sheet of the mask. A control unit 33 may be coupled by a wired or wireless connection to the light emitters. The control unit 33 may enable a user to perform any of the following actions: to turn on the light emitters, to alter the intensity of the light emitters and to cause the light emitters to extinguish after a predetermined time.

The light emitters are distributed over the area of the mask, so as to provide a generally uniform illumination to the skin of the wearer. The light emitters may be encapsulated behind a translucent film 33 which extends over at least a part of the posterior of the mask. The translucent film may protect the light emitters. The translucent film may diffuse light emitted by the light emitters so as to improve its uniformity.

FIG. 3 shows a cross-section through a portion of the mask. As shown in FIG. 1 and FIG. 3, the sheet 1 forming the body of the mask comprises a main or backing element 34 and the translucent film 33. The main element is formed so as to comprise thickened rims 35 around the periphery of the mask and around the eye, nose and mouth openings. The thickened rims extend to the rear of the mask. The main element may be moulded in this form, for example by injection moulding or flop moulding. The light emitters can then be applied to the main element. The translucent film can then be moulded over the light emitters. The translucent film can be moulded to the thickness of the rims, so that the sheet 1 comprising the main element and the translucent film has a uniform thickness. The translucent film can be injection moulded on to the rear face of the main element 34. The rims 35 can serve to contain the translucent film as it is being moulded on to the rear of the mask. Alternatively, as will be described further below, if the translucent layer is formed separately and then bonded to the backing layer, the rims may help to locate the translucent layer on the backing layer.

The conductive connections 31 may be sandwiched between the backing element 34 and the translucent film 33. The conductive connections 31 and the light emitters 30 may be provided on a common flexible circuit board. This may make it easier to install them in the mask structure.

The mask may comprise two layers of elastomer. The layers may be adhered to each other directly or indirectly. A flexible circuit component, which may comprise a flexible circuit board or a set of discrete components may be sandwiched between the layers. The layers may be of substantially equal thickness. The rear or posterior layer may have the same or a lower hardness than the forward layer. The rear layer may be translucent. It may be transparent. The elastomer materials may be silicone elastomer. They may comprise cross-linked polymer. The rear layer may have a greater degree of cross-linking than the forward layer. The mask may be concave to the rear layer. The mask may have apertures therethrough. The periphery of each aperture may be formed exclusively by the forward layer. The forward layer may define a wall extending round each aperture for spacing the rear layer from the periphery of each aperture. The rear layer may have the same or a lower elastic modulus as the forward layer. A soft rear layer may be more comfortable for a wearer.

The thickness of the backing layer 34 may be in the range from 0.1 to 5.0 mm, or from 2.0 to 3.0 mm. The thickness of the translucent layer may be in the range from 0.1 to 5.0 mm, or from 2.0 to 3.0 mm. In some convenient arrangements, the total thickness of the sheet 1 may be in the range from 4.5 to 5.5 mm, or in the range from 4.5 to 7.5 mm, or in the range from 5.5 to 7.5 mm.

The backing layer may be of an elastomeric material, for example a silicone elastomer, or of a rubber, for example a nitrile or butyl rubber. The density of the backing layer may be in the range from 0.5 to 1.5 $g/cm^3$, for example in the range from 1.0 to 1.1 $g/cm^3$. The Shore A hardness of the backing layer may be in the range from 10 to 100 degrees, for example from 30 to 40 or from 30 to 50 degrees. The backing layer may be formed of Genvan GA9041.

The translucent layer may be of an elastomeric material, for example a silicone elastomer, or of a rubber, for example a nitrile or butyl rubber. It may be of medical grade silicone material. The translucent layer may be formed of Genvan GA9041.

The silicone may be a platinum cure or addition cure silicone. It may comprise platinum as a catalyst. Its principal mode of cross-linking may be through linking of branches off principal polymer chains.

The translucent layer may be softer than the backing layer. The degree of cross-linking in the translucent layer may be less than that of the backing layer. For example, the proportion of cross-linked chains in the translucent layer may be less than 90% or less than 80% that in the backing layer.

The backing layer may be opaque to light.

The flexibility of the mask may be such that the force that needs to be applied between the lateral edges of the mask to cause them to touch each other when the mask is bent about a vertical axis is in the range from 0.7 to 1.5 N.

In order to provide the mask with a suitable balance of rigidity and flexibility the backing layer and the translucent layer may both be formed of silicone elastomer that has undergone substantial cross-linking.

In a first manufacturing step, the backing layer may be formed by injecting silicone monomer or precursor into a mould. The silicone may then be induced to cross-link, for example through the action of heat and/or the presence of one or more cross-linking agents. The cross-linking may be as a result of vulcanisation. To bring about vulcanisation the polymer or precursor may be heated in the presence of sulphur or a sulphur-containing compound suitable for liberating sulphur. The sulphur may form cross-linking bridges between polymer chains.

In a second manufacturing step the light emitters and their electrical interconnections, which may be on a common flexible circuit board, are applied to the rear face of the backing layer.

In a third manufacturing step, the backing layer and the electrical components are inserted into a second mould cavity and silicone monomer or precursor for the translucent layer is injected into the mould to be co-moulded with the other components. That silicone may then be induced to cross-link, for example through the action of heat and/or the presence of one or more cross-linking agents. The cross-linking may be as a result of vulcanisation. If heat is used, it may result in increased cross-linking of the backing layer. Alternatively, the translucent sheet may be formed by moulding separately from the backing layer, during which moulding it may be cross-linked, and the translucent layer may then be attached by adhesive to the backing layer and/or the circuit board.

It has been found that a particularly convenient method for manufacturing the mask is to form the backing layer in a first moulding process during which it is partially cross-linked, and then to co-mould the translucent layer to the backing layer in a second moulding process during which the translucent layer is cross-linked and the backing layer is further cross-linked. One potential benefit of this process is that after the first moulding process the backing layer has sufficient stiffness to allow for easy handling and to permit it to act to contain the translucent layer during the moulding thereof, but without it becoming excessively rigid following the second moulding step. A second potential benefit is that the translucent layer, which will predominantly sit against the wearer's skin, can readily be made softer than the backing layer. In one example, the first moulding step may include a vulcanisation or other cross-linking stage of 120 s at 150° C., and the second moulding step may include a vulcanisation or other cross-linking stage of 700 s at 155° C. It is convenient if the backing layer and the translucent layer are made of the same polymer, optionally with different pigment additives.

In the present application the terms "lower", "upper", "front", "forward", "rear", "posterior" etc. are used with reference to the mask in the orientation in which it would be applied to an upright face.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein, and without limitation to the scope of the claims. The applicant indicates that aspects of the present invention may consist of any such individual feature or combination of features. In view of the foregoing description it will be evident to a person skilled in the art that various modifications may be made within the scope of the invention.

The phrase "configured to" or "arranged to" followed by a term defining a condition or function is used herein to indicate that the object of the phrase is in a state in which it has that condition, or is able to perform that function, without that object being modified or further configured.

The invention claimed is:

1. A method for forming a phototherapy mask, the method comprising the following steps in the following order:
   forming a backing layer of a polymer material;
   in a first treatment step, treating the backing layer so as to cause cross linking of the polymer material of the backing layer;
   disposing a plurality of light emitters over the backing layer;
   forming a translucent layer of a polymer material over the light emitters and at least part of the backing layer; and
   in a second treatment step, treating the translucent layer and the backing layer so as to cause cross linking of the polymer material of the translucent layer and further cross linking of the polymer material of the backing layer.

2. The method as claimed in claim 1, wherein said treating in the first treatment step and the second treatment step comprises heating the layer(s) to a temperature greater than 130° C.

3. The method of claim 1, wherein the backing layer and the translucent layer are made of the same polymer material.

4. The method of claim 1, wherein the further cross linking of the polymer material of the backing layer causes the backing layer to be harder than the translucent layer.

5. The method of claim 1, wherein the first treatment step comprises applying a cross linking treatment to the backing layer at a first temperature, and the second treatment step comprises applying a cross linking treatment to the translucent layer and the backing layer at a second temperature higher than the first temperature.

6. The method of claim 1, wherein the second treatment step is applied to cause the proportion of cross-linked chains in the polymer material of the backing layer to be greater than the proportion of cross-linked chains in the polymer material of the translucent layer.

\* \* \* \* \*